United States Patent [19]

Watts

[11] 4,070,442
[45] Jan. 24, 1978

[54] STABILIZED HYDROGEN PEROXIDE

[75] Inventor: John Conway Watts, Wilmington, Del.

[73] Assignee: E. I. Du Pont de Nemours and Company, Wilmington, Del.

[21] Appl. No.: 727,363

[22] Filed: Sept. 27, 1976

Related U.S. Application Data

[63] Continuation of Ser. No. 393,056, Aug. 30, 1973, abandoned.

[51] Int. Cl.$^2$ ............................................. C01B 15/02
[52] U.S. Cl. ...................................... 423/272; 423/584
[58] Field of Search .................. 423/272, 584; 252/186

[56] References Cited

U.S. PATENT DOCUMENTS

| | | | |
|---|---|---|---|
| 3,122,417 | 2/1964 | Blaser et al. | 423/272 |
| 3,387,939 | 6/1968 | Reilly et al. | 423/272 |
| 3,649,194 | 3/1972 | Glanville | 423/272 |
| 3,903,244 | 9/1975 | Winkley | 423/272 |

*Primary Examiner*—O. R. Vertiz
*Assistant Examiner*—Wayne A. Langel

[57] ABSTRACT

Aqueous hydrogen peroxide solutions containing (1) an organophosphorus compound selected from the group consisting of alkylidene diphosphonic acids, aminotri(methylenephosphonic acid), ethylenediaminetetra(methylenephosphonic acid), and soluble alkali metal salts of the foregoing acids an (2) and organic hydroxy compound selected from allyl alcohol, methallyl alcohol, phenol, o-chlorophenol, o-nitrophenol, o-aminophenol, p-chlorophenol, p-nitrophenol, p-aminophenol, and mixtures thereof are stable during use over a pH range of about 0.5 to 10 against catalytic decomposition by heavy metal ions and by surfaces of insoluble heavy metal sulfides. The stabilizer combinations of this invention are apparently synergistic and give unexpected hydrogen peroxide stability. The stabilized hydrogen peroxide solutions of the invention are especially useful in hydrometallurgical processes and in mineral separations and purifications.

6 Claims, No Drawings

STABILIZED HYDROGEN PEROXIDE

This is a continuation of application Ser. No. 393,056, filed Aug. 30, 1973, now abandoned.

BACKGROUND OF THE INVENTION

This invention relates to stabilized aqueous hydrogen peroxide solutions containing an organic hydroxy compound and an organophosphorus compound in sufficient quantities to stabilize the hydrogen peroxide from decomposition in the presence of heavy metal ions, such as copper and iron, and in the presence of insoluble heavy metal sulfides, such as molybdenite and chalcopyrite. The stabilized aqueous hydrogen peroxide solutions of this invention are particularly useful in mining and mineral processing applications where high concentrations of heavy metal ions and heavy metal sulfides are present.

It is known that wasteful decomposition of hydrogen peroxide is catalyzed by small amounts of impurities, especially heavy metal ions. Aluminum cations are introduced into the hydrogen peroxide when aluminum containers and vessels, commonly used to store and handle hydrogen peroxide solutions, become corroded by such solutions. Calcium and magensium ions, and sometimes iron, copper and manganese ions are introduced into hydrogen peroxide solutions when such solutions are diluted with hard water, generally, at the site of use. In addition, it is well known that hydrogen peroxide is more stable in acidic solutions than in basic solutions.

The wasteful decomposition of hydrogen peroxide, which was referred to above and which is catalyzed by heavy metal ions, can be represented by the following equation:

$$2 H_2O_2 \rightarrow 2H_2O + O_2 \tag{1}$$

Many types of stabliizers have been proposed as inhibitors of this catalytic decompositon and have been added for that purpose to hydrogen peroxide solutions intended to be stored or shipped and later diluted for use.

Blazer et al., U.S. Pat. No. 3,122,417, disclose alkylidene diphosphonic acids as stabilizers for hydrogen peroxide solutions which are acidic or basic. In U.S. Pat. No. 3,387,939 to Reilly et al. there are disclosed stannate stabilizer compositions containing an alkylidene diphosphonic acid and acidic hydrogen peroxide solutions stabilized therewith. The presence of the alkylidene diphosphonic acid prevents the precipitation of the stannate by polyvalent cations, such as aluminum and calcium. Carnine et al., U.S. Pat. No. 3,383,174, disclose the use of a nitrilo trimethylene phosphonic compound in stannate stabilized peroxide solutions to preclude the precipitation of stannate by polyvalent cations.

Reilly, U.S. Pat. No. 3,687,627 discloses acidic stabilized hydrogen peroxide solutions containing a soluble stannate stabilizer, a soluble magnesium salt, an alkylidene diphosphonic acid or a soluble salt thereof and optionally a soluble pyrophosphate or fluosilicate. The magnesium compound serves as an effective stabilizer for the peroxide solution when it is rendered alkaline.

In U.S. Pat. No. 3,649,194 to Glanville there is disclosed the use of an organic hydroxy compound as stabilizer for acidified hydrogen peroxide solutions containing metal ions, particularly peroxide solutions useful for pickling copper. Useful organic hydroxy compounds disclosed therein are phenol, paramethoxyphenol, allyl alcohol, crotyl alcohol, and cis-1,4-but-2-ene-diol.

U.S. Pat. No. 3,701,825 to Radimer et al. is directed to the use of a water-soluble ethylenediamine tetra(methylenephosphonic acid) compound to stabilize aqueous hydrogen peroxide solutions over a pH range of at least 1.5 to 13.5 against decomposition by contaminants, such as cations or iron, copper and manganese.

With the exception of the Glanville patent, most of the prior art is directed to suppression of the wasteful decomposition of hydrogen peroxide under storage or shipping conditions or upon dilution at the user's site.

For some oxidation reactions, however, the $H_2O_2$ may be employed under conditions of high concentrations of metal ions. Conditions are especially harsh where both dissolved metal and insoluble metal sulfides are encountered. For example, the dissolution of chalcopyrite with $H_2O_2$ subjects the oxidizing agent to a number of decomposition catalysts:

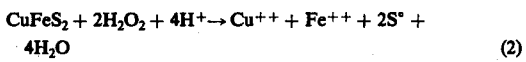

$$CuFeS_2 + 2H_2O_2 + 4H^+ \rightarrow Cu^{++} + Fe^{++} + 2S^\circ + 4H_2O \tag{2}$$

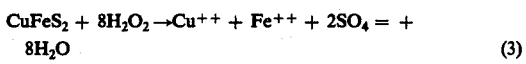

$$CuFeS_2 + 8H_2O_2 \rightarrow Cu^{++} + Fe^{++} + 2SO_4^= + 8H_2O \tag{3}$$

In order to use effectively the $H_2O_2$ for the desired reactions (2) and (3), the wasteful decomposition reaction (1) must be suppressed.

Thus, there is a need for hydrogen peroxide solutions which are stable over a wide pH range and under harsh conditions of use wherein relatively high concentrations of metal ions and insoluble metal sulfides are encountered.

SUMMARY OF THE INVENTION

It has been discovered that an organophosphorus compound combined with hydroxy organic compound is useful for stabilizing aqueous hydrogen peroxide solutions against catalytic decomposition from the presence of heavy metal ions and insoluble heavy metal sulfides.

Specifically, it has been found that an aqueous hydrogen peroxide solution containing an alkylidene diphosphonic acid of the formula

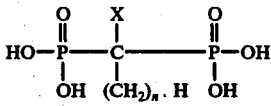

wherein X is hydrogen or the hydroxyl radical and n is a whole number from 0 to 5, aminotri(methylenesphosphonic acid), ethylenediaminetetra(methylenephosphonic acid), or an alkali metal salt of any of the foregoing acids and an organic hydroxy compound selected from the group consisting of allyl alcohol, methallyl alcohol, phenol, o-chlorophenol, o-nitrophenol, o-aminophenol, p-chlorophenol, p-nitrophenol, p-aminophenol and mixtures thereof is stable during use over a pH range of 0.5 to about 10 against catalytic decomposition caused by the presence of heavy metal ions and insoluble heavy metal sulfides. The organophosphorus compound and hydroxy organic compound should be present in a combined amount of from 0.05 to 33 weight percent based upon the weight of hydrogen peroxide in solution with the relative ratios of the two components being within the range of 10:1 to 1:10 and preferably 3:1 to 1:3.

The stabilizer combinations of this invention are apparently synergistic and result in unexpected hydrogen peroxide stability. These stabilized hydrogen peroxide solutions are particularly useful in mining applications where high concentrations of heavy metal ions are encountered, such as situations described by equations (2) and (3) hereinabove.

DESCRIPTION OF THE INVENTION

The alkylidene diphosphonic acid compounds which are used in the novel compositions of this invention have the formula

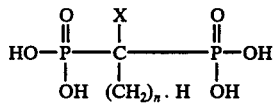

wherein X is hydrogen or the hydroxyl radical and $n$ is a whole number from 0 to 5, and the alkali salts thereof. Examples of such diphosphonic acid are methylene and ethylidene diphosphonic acids, and 1-hydroxyethylidene, 1-hydroxypropylidene, and 1-hydroxybutylidene 1,1-diphosphonic acid. It is preferred to use 1-hydroxyethylidene 1,1-diphosphonic acid since it is available commercially. A suitable commercial source is "Dequest" 2010, a product of Monsanto Co. which contains from 58 to 62% of 1-hydroxyethylidene 1,1-diphosphonic acid.

A suitable commercial source of amino tri(methylenephosphonic acid) is "Dequest" 2000, a product of Monsanto Co. which contains 49–51% of said acid in water. Any water-soluble alkali metal salt of aminotri(-methylenephosphonic acid) can be used in the compositions of the invention; however, the pentasodium salt is preferred, since this salt is commercially available. A suitable source of the pentasodium salt is "Dequest" 2006, which also is a product of Monsanto Co. and contains 39–41% of said salt in an aqueous solution.

The organic hydroxy compound employed in this invention is selected from the group consisting of allyl alcohol, methallyl alcohol, phenol, o-chlorophenol, o-nitrophenol, o-aminophenol, p-chlorophenol, p-nitrophenol and mixtures thereof. In a preferred embodiment of the invention the organic hydroxy compound is phenol or allyl alcohol.

When the organic hydroxy compound chosen from the group disclosed hereinabove and the organo phosphorus compound selected from the disclosed group are used in combination to stabilize aqueous hydrogen peroxide solutions unexpected apparent synergistic results are obtained. The resulting stabilization is greater than expected on the basis of the stabilization achieved with the organic hydroxy compound or the organophosphorus compound alone. The apparent synergistic effect is especially noticeable when the peroxide solution is used with a mixture of heavy metal ions and insoluble sulfide minerals, as is commonly encountered in the mining industry where peroxide solutions are employed to solubilize sulfide minerals or to effect oxidations in the presence of heavy metal cations.

The amount of the organophosphorus compound and organic hydroxy compound used to stabilize an aqueous hydrogen peroxide solution can vary from 0.05 percent to 33 percent by weight based upon the weight of hydrogen peroxide in the solution. The relative amounts by weight of organophosphorus compound to organic hydroxy compound should be within the range of about 10:1 to 1:10, with the preferred range being from about 3:1 to 1:3. Beyond the range of 10:1 to 1:10 the amount of the minor component may become too small to be effective.

The amount of stabilizers to be added to the hydrogen peroxide solutions is determined by how the hydrogen peroxide will be used. For oxidation reactions in the presence of small amounts of copper and iron cations, low concentrations of the stabilizers will suffice. However, when oxidation reactions are conducted in the presence of high concentrations of cations and in the presence of insoluble heavy metal mineral sulfides, high concentrations of the stabilizers will be needed.

Since hydrogen peroxide is generally produced and sold commercially as relatively concentrated acidic solutions, the hydrogen peroxide solution to be stabilized in accordance to the invention will usually be an acidic aqueous solution. Since many uses of hydrogen peroxide solutions require that the solutions be alkaline rather than acidic, the hydrogen peroxide solutions are customarily made basic at the site of use. The hydrogen peroxide solutions stabilized in accordance with the invention are stable under conditions of use over a pH range of about 0.5 to 10. Hence, the solutions of the invention are stable even when rendered basic at the user's site.

The compositions of this invention are prepared by adding the stabilizing agents to aqueous solutions of hydrogen peroxide. Commercial hydrogen peroxide may be diluted with distilled water or with demineralized water. Then the stabilizing components are added with stirring to give the novel compositions of this invention.

The compositions of this invention can be prepared at the site of the manufacturer of the hydrogen peroxide. Since the shipping of unneeded water is not economical, the solutions should be prepared as concentrated as possible. Where low concentrations of stabilizers will be employed, concentrations up to 70% can be made. However, where high concentrations of stabilizers are desired, the hydrogen peroxide concentrations should be limited to about 50% or less.

Aqueous hydrogen peroxide solutions stabilized in accordance with the invention disclosed herein are effectively stabilized even when heavy metal ions are present at concentrations as high as 5 percent by weight.

The stabilized aqueous hydrogen peroxide solutions of the invention are useful in mining applications where heavy metal ion concentrations as well as insoluble metal sulfides, are frequently encountered. One example of such use is the application of an acidified peroxide solution for the removal of copper and lead impurities from molybdenite concentrates.

It is important to distinguish between stabilization for storage, shipping and dilution versus stabilization in the end use of the hydrogen peroxide. For storage, shipping and dilution many of the current commercial hydrogen peroxides are adequate. However, these commercial hydrogen peroxide materials are not effective for oxidation reactions in the presence of more than trace amounts of the heavy metal contaminants. Thus, the word stabilization in this invention refers to stabilization of the hydrogen peroxide against wasteful decomposition which is catalyzed by more than trace amounts of heavy metal cations and by surfaces of heavy metal mineral sulfides.

This invention is further illustrated by the examples below which are not intended to limit the invention in any manner. These examples show the effect of adding a stabilizer to hydrogen peroxide solutions used to extract metal impurities from ore concentrates and for solubilizing metal sulfide minerals. All parts and percentages are by weight unless otherwise indicated.

EXAMPLE 1

Into a clean 2-liter beaker were added 450 parts of a 70% commercial hydrogen peroxide, such as "Albone" CG 70, a product of the Du Pont Co., 441 parts of distilled water, 4.5 parts of "Dequest" 2010, an alkylidene diphosphonic salt sold by the Monsanto Co., and 4.5 parts of liquified phenol. The mixture was stirred until it was homogeneous. The resulting composition contained 35% hydrogen peroxide, and 1% total stabilizers; the "Dequest" 2010 and phenol being present in a 1:1 weight ratio. The solution had a slight yellow color. In an accelerated storage test (15 hrs. at 100° C.) the composition showed a loss of hydrogen peroxide of 1.1% per simulated year.

EXAMPLE 2

Into a 2-liter beaker were added 450 parts of a commercial 70% hydrogen peroxide, such as "Albone" CG 70, 441 parts of distilled water, 4.5 parts of "Dequest" 2010 and 4.5 parts of allyl alcohol. The resulting composition contained 35% hydrogen peroxide and 1% of stabilizing chemicals. The solution was essentially colorless and gave a simulated one year storage test equal to 0.4% hydrogen peroxide loss.

EXAMPLE 3

Into a 2-liter beaker were added 450 parts of 70% hydrogen peroxide, 369 parts of demineralized water, 54 parts of "Dequest" 2010 and 27 parts of phenol. The resulting composition had a slight yellow coloration. It contained 35% hydrogen peroxide and 9% total stabilizers.

The following table had examples of further compositions prepared according to the proecdure of Example 1.

| Ex. | Component A | Component B |
|---|---|---|
| 4 | methallyl alcohol - 4.5 parts | "Dequest" 2010 - 4.5 parts |
| 5 | o-chlorophenol - 4.5 parts | "Dequest" 2000 - 4.5 parts |
| 6 | o-nitrophenol - 4.5 parts | "Dequest" 2006 - 9 parts |
| 7 | o-aminophenol - 9 parts | "Dequest" 2000 - 4.5 parts |
| 8 | p-chlorophenol - 6 parts | "Dequest" 2010 - 6 parts |
| 9 | p-nitrophenol - 2 parts | "Dequest" 2010 - 2 parts |
| 10 | p-aminophenol - 12 parts | "Dequest" 2010 - 6 parts |

STABILIZERS ADDED TO 450 PARTS OF "ALBONE" CG 70 AND 440 PARTS OF DISTILLED WATER

EXAMPLE 11

The apparent synergistic effect of the stabilizing agents used in the compositions of this invention is clearly illustrated by the mixing of molybdenite concentrate with the compositions of this invention.

To illustrate relative stabilities of solutions of hydrogen peroxide in the presence of molybdenite concentrate, the following general experiment was performed. Into a 125 ml flask were added in turn 22.2 parts of distilled water containing sufficient sulfuric acid to give a pH of 2.5, 1.7 parts of commercial 70% hydrogen peroxide, such as "Albone" CG 70, the stabilizing agents, and 20 parts of molybendenite concentrate. The molybdenite concentrate contained 53.3% molybdenum and 0.51% copper. The mixture was held at 23° C. and stirred magnetically. The flask was stoppered and equipped with tubing leading to an inverted, water-filled graduated cylinder in a container of water. The quantity of released oxygen was read directly from the graduated cylinder and was not corrected for water vapor. The purpose of the stabilizing agents in the compositions of this invention is to suppress wasteful $H_2O_2$ decomposition as measured by molecular oxygen formation. While these agents suppress oxygen formation, they will not totally stop it. The key point in the experiment is the time during which hydrogen peroxide survived in the mixture. The hydrogen peroxide will dissolve copper impurities while solubilizing the molybdenite concentrate but slightly. For effective removal of impurities, the hydrogen peroxide must survive sufficiently long to solubilize most of the copper sulfide minerals. The following table records the effect of various stabilizing agents added according to the above general procedure.

TABLE I

TREATMENT OF MOLYBDENITE CONCENTRATE WITH HYDROGEN PEROXIDE

| Stabilizer Added | Time of $H_2O_2$ Survival, Mins. | $O_2$ Evolved (CC, uncorrected) | % Cu Solubilized |
|---|---|---|---|
| None | 6 | * | — |
| phenol - .48 parts | 35 | 316 | 20.6 |
| "Dequest" 2010 - .48 parts | 75 | 195 | 31.1 |
| phenol - .24 parts + "Dequest" 2010 - .24 parts | 360 | 160 | 59.0 |

*$O_2$ evolved too fast to measure.

EXAMPLE 12

The experiment of Example 11 was repeated, except a different series of stabilizing systems was employed.

TABLE II

TREATMENT OF MOLYBDENITE CONCENTRATE WITH HYDROGEN PEROXIDE

| Stabilizer Added | Time of $H_2O_2$ Survival, Mins. | $O_2$ Evolved (CC) | % Cu Solubilized |
|---|---|---|---|
| Allyl alcohol - 0.48 parts | 22 | 335 | 36.9 |
| "Dequest" 2010 - 0.48 parts | 75 | 195 | 31.1 |
| Allyl alcohol - 0.24 parts + "Dequest" 2010 - 0.24 parts | 160 | 155 | 56.5 |

EXAMPLE 13

The experiment of Example 11 was repeated, except that the water added was at pH 4.5. The following results were obtained:

TABLE III

TREATMENT OF MOLYBDENITE CONCENTRATE WITH HYDROGEN PEROXIDE

| Stabilizer Added | Time of $H_2O_2$ Survival, Mins. | $O_2$ Evolved (CC) | % Cu Solubilized |
|---|---|---|---|
| Phenol - 0.48 parts | 29 | 343 | 51 |
| "Dequest" 2010 - 0.48 parts | 189 | 205 | 42 |
| Phenol - 0.24 parts + "Dequest" 2010 - 0.24 parts | 222 | 178 | 70 |

EXAMPLE 14

Into a 125 ml flask, equipped as in Example 11, were added in turn 22.2 parts of distilled water (made pH 2.5 with sulfuric acid), 1.7 parts "Albone" CG 70, 0.02 parts of o-aminophenol, 0.02 parts "Dequest" 2010 and 20.0 g. molybdenite concentrate. The hydrogen peroxide survived in the reaction mixture for 30 minutes. The mixture was filtered and the solution contained dissolved copper at a concentration of 1.35 parts per million parts of solution. When the o-aminophenol or "Dequest" 2010 was used alone, the hydrogen peroxide survived only for 6 minutes.

EXAMPLE 15

The pH of the molbdenite concentrate treatment will vary during the course of the reaction. The following experiment shows the changes in pH with time.

To a 125 ml flask, equipped as in Example 11, were added in turn 22.4 parts of distilled water made pH 4.5 with sulfuric acid, 1.7 parts "Albone" CG 70, 0.12 parts phenol, 0.12 parts "Dequest" 2010 and 20 parts molybdenite concentrate. The pH is, shortly after mixing, 1.74. After one minute the pH increased to 3.18 and reached a maximum after three minutes of 3.85, whereupon the pH declined slowly to a pH of 1.03 after 2 hours.

EXAMPLE 16

The following experiment illustrates the effects of varying the ratio of stabilizing components in the compositions of this invention. The following three hydrogen peroxide compositions were prepared:

A. 14 parts of 50% hydrogen peroxide 0.6 parts phenol, 1.2 parts "Dequest" 2010 and 4.2 parts distilled water.

B. 14 parts 50% hydrogen peroxide, 0.6 parts phenol, 0.6 parts "Dequest" 2010 and 4.8 parts of distilled water.

C. 14 parts 50% hydrogen peroxide, 0.9 parts phenol, 0.9 parts "Dequest" 2010 and 4.2 parts distilled water.

In the procedure of Example 11 the following results were obtained:

TABLE IV
TREATMENT OF MOLYBDENITE CONCENTRATE WITH HYDROGEN PEROXIDE

| Composition Used | Time of $H_2O_2$ Survival, Mins. | $O_2$ Evolved (CC) |
|---|---|---|
| A | 130 | 175 |
| B | 21 | 225 |
| C | 85 | 203 |

EXAMPLE 17

Into a 125 ml flask equipped as in Example 11 were added in turn 22 parts of distilled water made pH 2.0 with sulfuric acid, 0.06 parts phenol, 0.03 parts "Dequest" 2010, 3.4 parts 70% hydrogen peroxide, and 10 parts of copper concentrate. The copper concentrate contained 29.6% copper and 19.8% iron. The stirred mixture was measured for hydrogen peroxide. The hydrogen peroxide survived for 101 minutes. In the same experiment without adding the stabilizing agents, the hydrogen peroxide survived for only 64 minutes.

EXAMPLE 18

The compositions of this invention can be used to treat molybdenite concentrates under conditions which are initially alkaline.

For the treatment of molybdenite concentrates on the alkaline side, a solution of ammonium sulfate, adjusted to pH 8.1 with ammonium hydroxide, was added to molbydenite concentrate, and then treated with stabilized hydrogen peroide according to the following procedure:

Into a 125 ml flask were added 12 parts of pH 8.1 ammonium sulfate solution and 10 parts of molybdenite concentrate. To the mixture at 23° C. were added 1.50 parts of 40% hydrogen peroxide, 0.1 part of allyl alcohol and 0.1 part of "Dequest" 2000. The reaction mixture was stirred and checked periodically for hydrogen peroxide content. The hydrogen peroxide survived in the mixture for 60 minutes. The mixture was filtered and the filtrate contained solubilized copper at a concentration of 2.03 parts per million.

The following experiments were performed according to the procedure of Example 18:

TABLE V
TREATMENT OF MOLYBDENITE CONCENTRATE WITH HYDROGEN PEROXIDE

| Ex. | Stabilizing Agent | Time of $H_2O_2$ Survival, Mins. | Copper Concentration in the Leachant, ppm |
|---|---|---|---|
| 19 | 0.15 parts "Dequest" 2000 | 15 | 1.04 |
| 20 | 0.15 parts "Dequest" 2010 | 14 | 1.75 |
| 21 | 0.15 parts phenol | 49 | 1.72 |
| 22 | 0.15 parts p-aminophenol | 1 | .003 |
| 23 | 0.1 parts "Dequest" 2000 + 0.1 part phenol | >89 | 2.91 |
| 24 | 0.1 part phenol + 0.1 part "Dequest" 2010 | 60 | 2.39 |
| 25 | None | 1 | 0.29 |

Thus it is evident from the table that the combination of organophosphorus compound and phenol gives a synergistic effect, both from the standpoint of hydrogen peroxide survival time and the quantity of copper impurity removed from the molybdenite concentrate.

The invention claimed is:

1. An aqueous hydrogen peroxide solution having improved stability in the presence of heavy metal ions and insoluble heavy metal sulfides containing from 3–70 weight percent hydrogen peroxide; an alkylidene diphosphonic acid having the formula

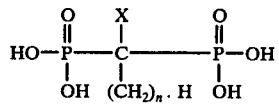

wherein X is hydrogen or the hydroxyl radical and $n$ is a whole number from 0 to 5, or soluble alkali metal salts thereof; and an organic hydroxy compound selected from the group consisting of allyl alcohol, methallyl alcohol, phenol, o-chlorophenol, o-nitrophenol, o-aminophenol, p-chlorophenol, p-nitrophenol, p-aminophenol, and mixtures thereof; said alkylidene diphosphonic acid and organic hydroxy compound being present in combined amounts from about 0.05 to 33 weight percent based upon the weight of the hydrogen peroxide in solution and in a weight ratio of alkylidene diphosphonic acid to organic hydroxy compound of from about 10:1 to 1:10.

2. A stabilized aqueous hydrogen peroxide solution of claim 1 wherein the hydroxy compound is phenol or allyl alcohol, and the hydrogen peroxide concentration is from 35 to 50 weight percent.

3. A stabilized aqueous hydrogen peroxide solution of claim 1 wherein the alkylidene diphosphonic acid is 1-hydroxyethylidene 1,1-diphosphonic acid.

4. A method of stabilizing an aqueous hydrogen peroxide solution containing 3 to 70 weight percent hydrogen peroxide against decomposition in the presence of heavy metal ions and insoluble heavy metal sulfides comprising adding to the aqueous hydrogen peroxide solution an alkylidene diphosphonic acid having the formula

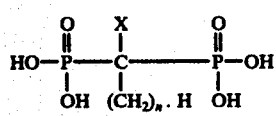

wherein X is hydrogen or the hydroxyl radical and $n$ is a whole number from 0 to 5 or soluble alkali metal salts thereof; and an organic hydroxy compound selected from the group consisting of allyl alcohol, methallyl alcohol, phenol, o-chlorophenol, o-nitrophenol, o-aminophenol, p-chlorophenol, p-nitrophenol, p-aminophenol, and mixtures thereof; said alkylidene diphosphonic acid and organic hydroxy compound being added in a combined amount of from about 0.05 to 33 weight percent based upon the weight of the hydrogen peroxide in solution and in a weight ratio of alkylidene diphosphonic acid to organic hydroxy compound of from about 10:1 to 1:10.

5. A method of claim 5 wherein the hydrogen peroxide concentration is from about 35 to 50 weight percent, and the organic hydroxy compound is phenol or allyl alcohol.

6. A method of claim 4 wherein the alkylidene diphosphonic acid 1-hydroxyethylidene 1,1-diphosphonic acid.

* * * * *